Figure 1:
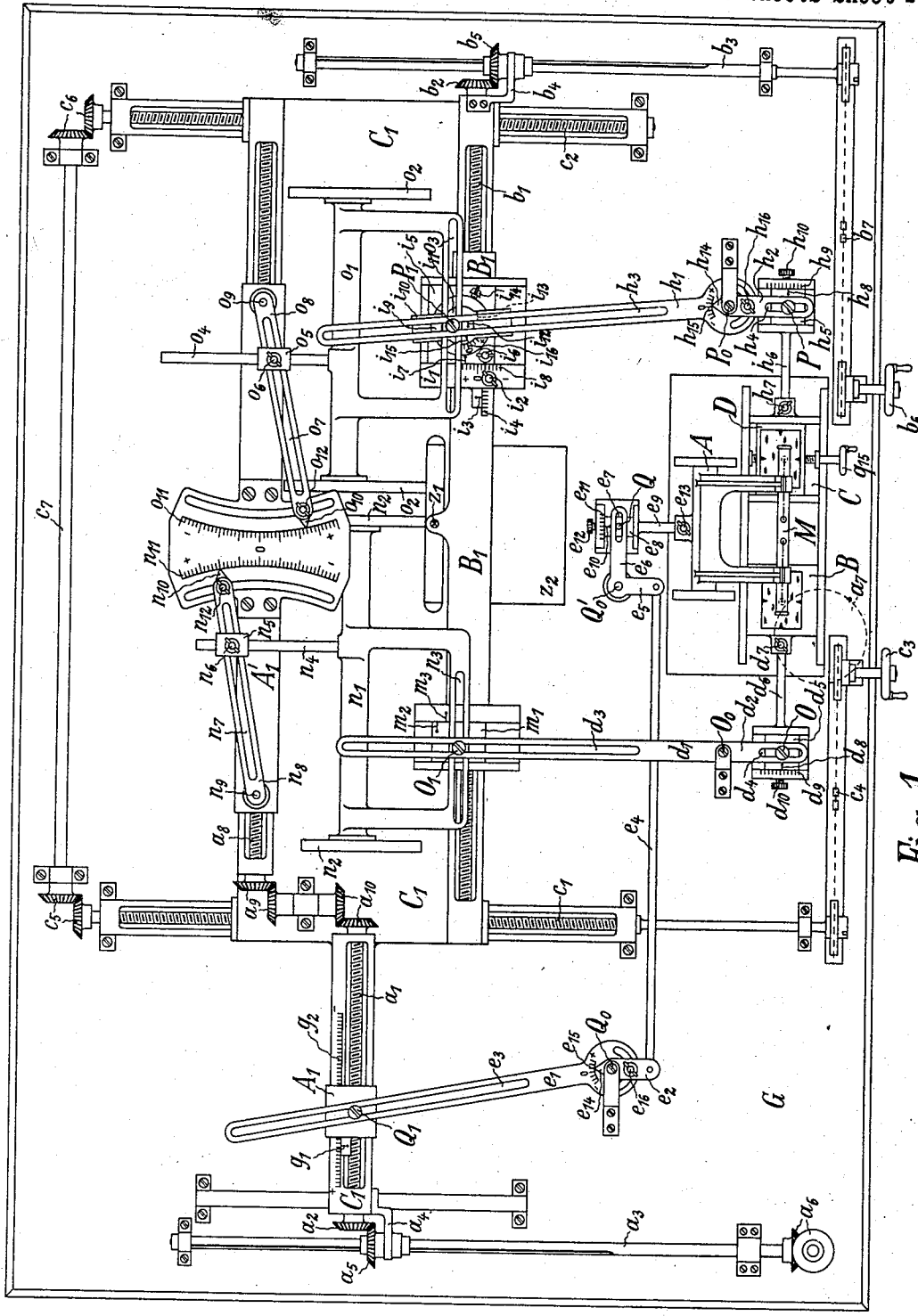

Dec. 11, 1923.

W. SANDER

STEREOAUTOGRAPH

Filed Nov. 11, 1920

1,477,082

5 Sheets-Sheet 2

Inventor:
Willy Sander

Dec. 11, 1923.

W. SANDER

STEREOAUTOGRAPH

Filed Nov. 11, 1920

1,477,082

5 Sheets-Sheet 4

Inventor:
Willy Sander

Dec. 11, 1923.  1,477,082
W. SANDER
STEREOAUTOGRAPH
Filed Nov. 11, 1920  5 Sheets-Sheet 5

Inventor:
Willy Sander

Patented Dec. 11, 1923.

1,477,082

UNITED STATES PATENT OFFICE.

WILLY SANDER, OF JENA, GERMANY, ASSIGNOR TO FIRM OF CARL ZEISS, OF JENA, GERMANY.

STEREOAUTOGRAPH.

Application filed November 11, 1920. Serial No. 423,520.

*To all whom it may concern:*

Be it known that I, WILLY SANDER, a citizen of the German Empire, residing at Jena, Germany, have invented a new and useful Stereoautograph, of which the following is a specification.

The present invention relates to a device which serves for tracing on a plane surface linear elements, to be obtained from a photostereogram, of a spatial form, and which is equipped with a stereo-comparator comprising a binocular double microscope with two marks and four slides (A, B, C, and D), and provided with a cross-slide system consisting of three members, viz. a height-slide ($A_1$), a breadth-slide ($B_1$), and a depth-slide ($C_1$), the depth-slide forming the lowest member, while the height-slide ($A_1$) and the breadth-slide ($B_1$) are disposed next to each other on the depth-slide ($C_1$), the breadth-slide ($B_1$) being fitted with a drawing pencil, which, along with a drawing board fixed to the support of the said cross-slide system, forms a drawing device, furthermore, the slides A and $A_1$, B and $B_1$, C and $B_1$ respectively being positively connected together by means of lever systems in such a manner that, on the slide D being suitably adjusted, the position of the drawing pencil relatively to the drawing surface corresponds in each case to the horizontal projection of that object-point, the images of which are seen in the stereo-comparator as coinciding with the marks of the microscope, the point of application on the slide $B_1$ of the lever system connecting the slides C and $B_1$ being so disposed as to be adjustable relatively to the slide $B_1$. The four slides A, B, C, and D of the stereo-comparator are designed for the following purpose. The slide A serves for shifting the microscope, or both photograms, or only one of the two photograms, in the height-direction of the photograms, the height-direction of each photogram signifying the direction of the section-line of the photogram with the vertical plane, determined by the axis of the objective for taking the photograms. The slide B serves for shifting the microscope, or both photograms, or, when the slide A carries only one of the two photograms, for shifting this one photogram in the breadth-direction of the photograms, the breadth-direction of each photogram signifying that direction which stands perpendicularly on the height-direction. The slide C serves, on the slide B carrying the microscope or both photograms, for shifting either of the two photograms, or, on the slide B carrying only one of the two photograms, for shifting the other photogram in the breadth-direction. The slide D serves, on the slide A carrying the microscope or both photograms, for shifting either of the two photograms or, on the slide A carrying only one of the two photograms, for shifting the other photogram in the height-direction.

Devices of this kind are known in literature by the name of "Stereo-autograph," and have repeatedly been described. The course of development of the stereo-autograph may be followed up with reference to the patent specifications 1090494, 1151996, (application Serial No. 425546), (application Serial No. 427865), and (application Serial No. 427866). Whilst the earlier types of construction, in accordance with Patent 1090494 are only to be employed for utilizing photograms, at the taking of which the so-called normal case was existing, i. e. for which the axes of the objectives were horizontal and perpendicular to the base-line, the latter types, such as dealt with in the patent specifications and (applications Serial No. 425546 and Serial No. 427866), permit of utilizing photograms, at the taking of which the axes of the objectives had any direction into space, however, with the restriction that only height-lines may be traced.

By the present invention a stereo-autograph is being introduced which is adapted for utilizing such photograms without any restriction whatever, and which will therefore permit of the tracing of the courses of roads and rivers as well, which is most essential for making maps of mountainous landscapes.

Figure 2:
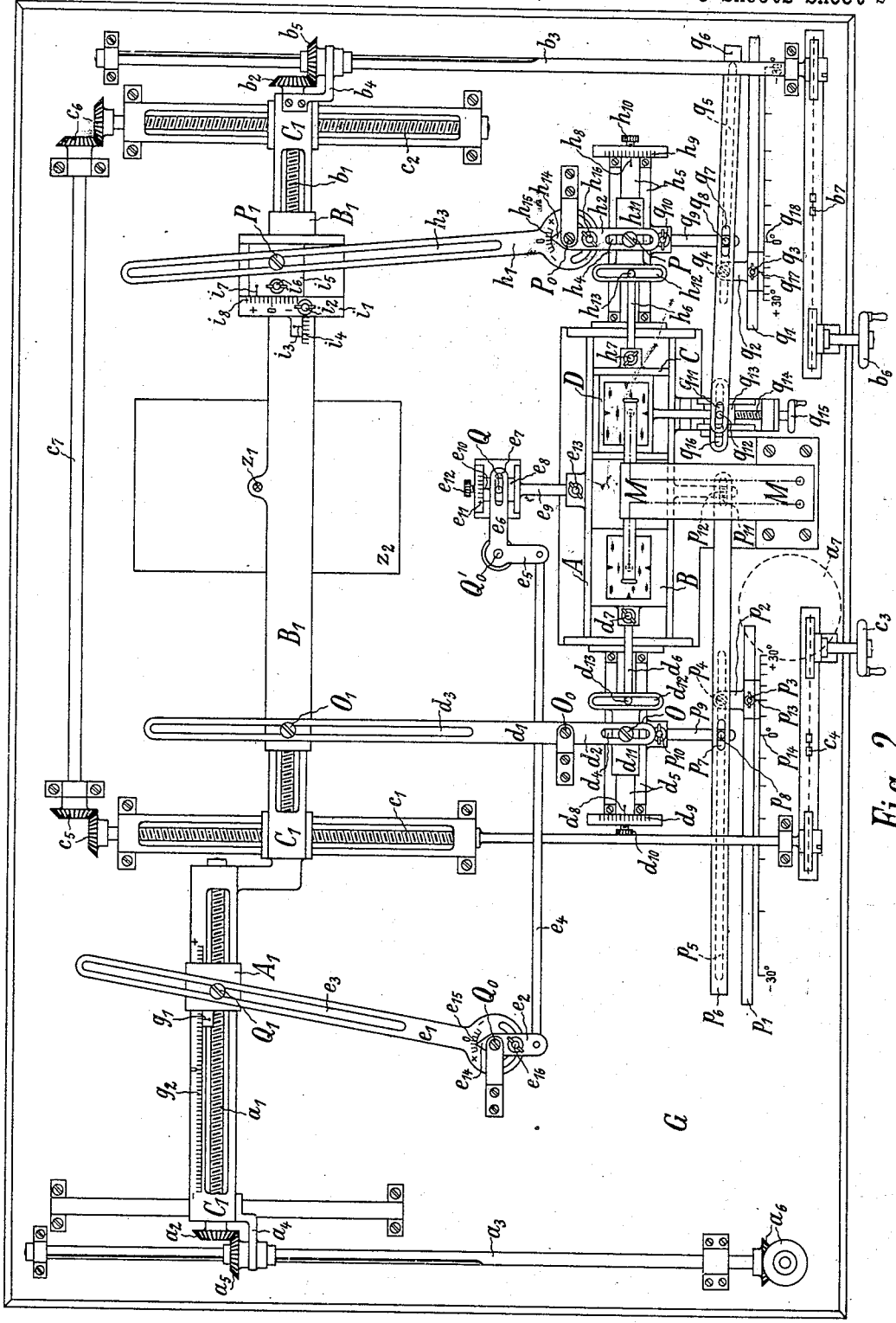

In the annexed drawing: Figs. 1$^a$ and 1$^b$ show together in plan a first constructional example of a stereo-autograph according to the invention. Figs. 2$^a$ and 2$^b$ are together a plan view of a second form, Figs. 3$^a$ and 3$^b$ are together a plan view of a third form, Figs. 4$^a$ and 4$^b$ are together a plan view of a fourth form and Figs. 5$^a$ and 5$^b$ are together a plan view of a fifth form of the improved stereo-autograph.

In the constructional example shown in Figs. 1$^a$ and 1$^b$ a stereo-autograph according to Patent (application Serial No. 427866) has thereby been devised as a stereo-autograph according to the invention that each of the points of application on the slide $B_1$ of the lever system connecting the slides C and $B_1$, and of the lever system connecting the slides B and $B_1$ respectively, is coupled with the slide $A_1$ in such a manner that, on the latter being displaced relatively to the slide C, each point of application receives a setting with respect to the slide $B_1$.

For the stereo-comparator the special case exists that the slide A carries the microscope M, that furthermore the slide B only carries the left photogram and that the slides C and D form a cross-slide system, of which D is the top slide, carrying the right photogram. The slide D is actuated by a hand-wheel $q_{15}$. The cross-slide system moving the drawing pencil $z_1$ relatively to a drawing board fixed to the bed-plate G is coupled with the stereo-comparator, and comprises as its lowest slide the depth-slide $C_1$, which is displaceable in the depth-direction, and on which the breadth-slide $B_1$, carrying the drawing pencil $z_1$ and the height-slide $A_1$, are disposed next to each other in such a manner that the direction of displacement of these two slides lies in the breadth-direction. The cross-slide system $A_1$, $B_1$, $C_1$ is so positioned with respect to the stereo-comparator that its breadth-direction coincides with the breadth-direction of the photograms, and its depth-direction with the height-direction of the photograms. The actuating of the stereo-autograph is effected by means of an actuating device, which moves the cross-slide system $A_1$, $B_1$, $C_1$. The height-slide $A_1$ is displaced by means of a screw-spindle $a_1$, which receives its motion by means of a bevel-wheel $a_2$ and from a grooved shaft $a_3$ by means of a bevel-wheel $a_5$, which is displaceable along the said shaft and coupled with the depth-slide $C_1$ by means of a stud $a_4$. The shaft $a_3$ is actuated by means of a pair of bevel-wheels $a_6$, and from a foot-disc $a_7$, which is accessible to the left foot of the observer, by means of further actuating members (omitted in the drawing) which are disposed beneath the bed-plate G. The breadth-slide $B_1$ is displaced by means of a screw-spindle $b_1$, which receives its motion by means of a bevel-wheel $b_2$ and from a grooved shaft $b_3$ by means of a bevel-wheel $b_5$, which is displaceable along the said shaft and coupled with the depth-slide $C_1$ by means of a stud $b_4$. The shaft $b_3$ is actuated by a hand-wheel $b_6$, which is accessible to the right hand of the observer, and the motions of which are transmitted to the said shaft by means of a chain-drive $b_7$. The depth-slide $C_1$ is displaced by means of two screw-spindles $c_1$ and $c_2$, of which the left-hand spindle $c_1$ receives its motion by means of a hand-wheel $c_3$, which is disposed to the left of the observer and coupled with the said spindle by means of a chain-drive $c_4$, whilst the right-hand spindle $c_2$ is actuated from the left-hand spindle by means of two pairs of bevel-wheels $c_5$ and $c_6$, and by a shaft $c_7$. The positive connection of the cross-slide system $A_1$, $B_1$, $C_1$, with the stereo-comparator is effected by means of a lever system.

For connecting the slides $B_1$ and B together, a double lever $d_1$, $d_2$ is so disposed on the bed-plate G as to be rotatable about an axis $O_0$, the two arms $d_1$ and $d_2$ of which lever being of different length and in alinement. The long arm $d_1$ engages by means of a slot $d_3$ with a stud $O_1$, this latter appertaining to a slide $m_1$, which is disposed on the slide $B_1$ so as to be displaceable in the depth-direction, and which is provided with an index $m_2$ to which an index $m_3$ of the slide $B_1$ appertains. When the two indices coincide, the slide $m_1$ occupies its zero-position. The short arm $d_2$ of the double lever engages by means of a slot $d_4$ with a stud O of a slide $d_5$, which is disposed on a small slide $d_6$ so as to be adjustable in the depth-direction. This small slide $d_6$ forms part of the slide B, and is for adjusting purposes so disposed that it may be set relatively to this slide in the breadth-direction, a clamping-screw $d_7$ being provided for clamping the small slide on the slide B. An index $d_8$ of the slide $d_5$ indicates on a scale $d_9$ of the small slide $d_6$ the component set in each case of the distance from the stud O to the axis of rotation $O_0$, which component falls into the depth-direction. A clamping-screw $d_{10}$ serves for clamping the slide $d_5$ on the small slide $d_6$.

Between the slides $A_1$ and A the following connection is provided. On the bed-plate G a double lever having two arms $e_1$ and $e_2$ of different length, the inclination of which relatively to one another being adjustable, is so mounted as to be rotatable about an axis $Q_0$. The long arm $e_1$ engages by means of a slot $e_3$ with a stud $Q_1$ of the slide $A_1$, the distance of which, on the slide $m_1$ occupying its zero-position, from the axis of rotation $Q_0$ being such that its component in the depth-direction is equal to the corresponding component of the distance from the stud $Q_1$ to the axis of rotation $O_0$. The short arm $e_2$ engages by means of a rod $e_4$ with one arm $e_5$ of an angle lever, which is so mounted on the bed-plate G as to be rotatable about an axis $Q_0'$, which, along with the axis of rotation $O_0$ of the double lever $e_1$, $e_2$, lies in a plane containing the breadth-direction. The arm $e_5$ of the angle lever has the same length as the arm $e_2$ of the double lever, and is parallel to the same. It embraces with the other arm $e_6$ of the angle lever an angle of 90°. This arm $e_6$ engages by means of a slot $e_7$ with a stud Q of a slide $e_8$, which is so disposed on a small slide $e_9$ as to be adjustable in the breadth-direction. This small slide $e_9$ forms part of the slide A, and may for adjusting purposes be set relatively to this slide in the direction of displacement of the same. An index $e_{10}$ of the slide $e_8$ indicates on a scale $e_{11}$ of the small slide $e_9$ that component set in each case of the distance from the stud Q to the axis of rotation $Q_0'$, which falls into the breadth-direction. A clamping-screw $e_{12}$ serves for clamping the slide $e_8$ on the small slide $e_9$, and a second clamping-screw $e_{13}$ for clamping the small slide $e_9$ on the slide A. The part exceeding 180° of the angle, embraced by the two arms $e_1$ and $e_2$ of the double lever $e_1$, $e_2$ and measured from the arm $e_1$ in clockwise direction, is indicated by an index $e_{14}$ of the arm $e_2$ on a graduation $e_{15}$ of the arm $e_1$, which graduation advances in clockwise direction. A clamping-screw $e_{16}$ serves for fixing the two arms relatively to one another. An index $g_1$ of the slide $A_1$ indicates on a scale $g_2$ of the slide $C_1$ the displacements of the slide $A_1$ out of its zero-position in which the arm $e_1$ of the double lever $e_1$, $e_2$ is parallel to the depth-direction.

The slides $B_1$ and C are connected together by means of a double lever $h_1$, $h_2$, which is mounted on the bed-plate G so as to be rotatable about an axis $P_0$, which, along with the axis of rotation $O_0$ of the double $d_1$, $d_2$, lies in a plane containing the breadth-direction. The two arms $h_1$ and $h_2$ of the double lever are of different length, and their relative inclination is adjustable. In a slot $h_3$ of the long arm $h_1$ there engages a stud $P_1$, which by means of a four-member slide system may be set relatively to the slide $B_1$. The lowest slide of this system is a slide $i_1$, which may be displaced in the breadth-direction and be clamped on the slide $B_1$ by means of a clamping screw $i_2$, and the displacements of which are indicated by means of an index $i_3$ on a scale $i_4$ of the slide $B_1$. A slide $i_5$ is so disposed on the slide $i_1$ that it may be displaced in the depth-direction and be clamped on the slide $i_1$ by means of a clamping-screw $i_6$, and its displacements are indicated by means of an index $i_7$ on a scale $i_8$ of the slide $i_1$. A third length-slide $i_9$ forms the top slide of the said system. It may be displaced along a straight-guide $i_{10}$ of a revolving slide $i_{11}$, and is provided with the aforementioned stud $P_1$ in such a manner that the latter, on the slide $i_9$ occupying its zero-position, in which its index $i_{12}$ coincides with an index $i_{13}$ of the straight-guide, lies in the axis of the revolving slide. The revolving slide $i_{11}$ is rotatably mounted on the slide $i_5$, and may be clamped on the latter by means of a clamping-screw $i_{14}$. An index $i_{15}$ of the revolving slide indicates on a graduation $i_{16}$ of the slide $i_5$, which graduation advances in counter-clockwise direction, that angle by which the revolving slide is turned out of its zero-position, in which its straight-guide $i_{10}$ is parallel to the depth-direction. When the slide $i_1$ occupies its zero-position, the stud $P_1$ must, along with the axis of rotation $P_0$, on the slide $i_9$ occupying its zero-position, lie in a vertical plane containing the depth-direction. When the slide $i_5$ occupies its zero-position, that component of the distance of the stud $P_1$ from the axis of rotation $P_0$ which falls into the depth-direction must, on the slide $i_9$ occupying its zero-position, be equal to the corresponding component of the distance of the stud $Q_1$ from the axis of rotation Q. The short arm $h_2$ of the double lever $h_1$, $h_2$ engages by means of a slot $h_4$ with a stud P of a slide $h_5$, which is disposed on a small slide $h_6$ so as to be adjustable in the depth-direction. This small slide $h_6$ forms part of the slide C, and may for adjusting purposes be set relatively to this slide in the breadth-direction, a clamping-screw $h_7$ being provided for clamping the small slide $h_6$ on the slide C. An index $h_8$ of the slide $h_5$ indicates on a scale $h_9$ of the small slide $h_6$ that component set in each case of the distance of the stud P from the axis of rotation $P_0$, which falls into the depth-direction. A clamping-screw $h_{10}$ serves for clamping the slide $h_5$ on the small slide $h_6$. The part exceeding 180° of the angle, embraced by the two arms $h_1$ and $h_2$ of the double lever $h_1$, $h_2$ and measured from the arm $h_1$ in clockwise direction is indicated by means of an index $h_{14}$ of the arm $h_2$ on a graduation $h_{15}$ of the arm $h_1$, which graduation advances in clockwise direction. A clamping-screw $h_{16}$ serves for fixing the two arms relatively to one another.

On the slide $C_1$, behind the slide $B_1$, there is mounted a slide $A_1'$ so as to be displaceable in the breadth-direction, which slide is actuated from the screw-spindle $a_1$ by means of a screw-spindle $a_8$ and two pairs of bevel-wheels $a_9$ and $a_{10}$, in such a manner that its displacement agrees with that of the slide $A_1$ as regards amount and direction. With this slide $A_1'$ the stud $O_1$ is so coupled as to receive, on the said slide (along with the slide $A_1$) being displaced in the breadth-direction, a displacement in the depth-direction, which depends on that displacement of the slide $A_1'$. For this purpose a slide $n_1$ is so disposed on the slide $C_1$ as to be displaceable along two guides $n_2$ in the depth-direction, which slide $n_1$ contains, on the one hand, parallel to the breadth-direction a slot $n_3$, in which the stud $O_1$ engages, and, on the other hand, a square pin $n_4$, which is parallel to the depth-direction, a box $n_5$ being so disposed that it may be set along this pin, and may be clamped on it by means of a clamping-screw $n_6$. This box $n_5$ engages by means of a pin, which in the drawing is to be supposed vertically beneath the clamping-screw $n_6$, in a slot $n_7$ of a lever $n_8$, which is mounted so as to be rotatable about a pin $n_9$ of the slide $A_1'$, in such a manner that the inclination of its slot $n_7$ relatively to the breadth-direction may be varied. The inclination set in each case, is indicated by means of an index $n_{10}$ of a lever $n_8$ on a graduation $n_{11}$ of the slide $A_1'$, which graduation advances in counter-clockwise direction. By means of a clamping-screw $n_{12}$ the lever $n_8$ may be clamped on the slide $A_1'$. On the slide $C_1$ there is disposed so as to be displaceable along two guides $o_2$ in the depth-direction a slide $o_1$, which contains, on the one hand, parallel to the breadth-direction a slot $o_3$ in which the stud $P_1$ engages, and, on the other hand, a square pin $o_4$, which is parallel to the depth-direction, a box $o_5$ being so disposed that it may be set along this pin $o_4$, and may be clamped on it by means of a clamping-screw $o_6$. This box $o_5$ engages by means of a pin, which in the drawing is to be supposed vertically beneath the clamping-screw $o_6$, in a slot $o_7$ of a lever $o_8$, which is mounted so as to be rotatable about a pin $o_9$ of the slide $A_1'$, in such a manner that the inclination of its slot $o_7$ relatively to the breadth-direction may be varied. The inclination set in each case is indicated by means of an index $o_{10}$ of the lever $o_8$ on a graduation $o_{11}$ of the slide $A_1$, which graduation advances in counter-clockwise direction. The lever may be clamped on the slide $A_1'$ by means of a clamping-screw $o_{12}$.

In order to get the device ready for use, the following settings are necessary. The index $d_8$ indicates on the scale $d_9$ the value $$\frac{f}{\cos \beta_1}.$$

The index $e_{10}$ indicates on the scale $e_{11}$ the value $f$. The index $h_8$ indicates on the scale $h_9$ the value $$\frac{f}{\cos \beta_2}.$$

The index $e_{14}$ indicates on the graduation $e_{15}$ the angle $\beta_1$. The index $h_{14}$ indicates on the graduation $h_{15}$ the angle $\gamma$. The index $n_{10}$ indicates on the graduation $n_{11}$ the angle $\beta_1$ and the index $o_{10}$ on the graduation $o_{11}$ the angle $\delta$. On the scale $i_4$ there is indicated by the index $i_3$ the value $b$ ($\cos \alpha \cos \varepsilon - \tan \beta_2 \sin \gamma \sin \varepsilon$), measured in the scale of the copy, whilst the index $i_7$ indicates on the scale $i_8$ the value $b$ ($\sin \alpha \cos \varepsilon - \tan \beta_2 \cos \gamma \sin \varepsilon$), measured in the scale of the copy. The index $i_{15}$ indicates on the graduation $i_{16}$ the angle $\gamma$.

In that case and further on the following lettering has been adopted:

$b$ : base-line, i. e., the line connecting the optical centres of the two objectives.

$f$ : focal length of the two objectives.

$\varepsilon$ : angle of inclination of the base-line relatively to the horizontal plane (positive, when the base-line, from the left hand objective onward, is inclined upwards).

$\alpha$ : angle of inclination of the left-hand objective axis relatively to the perpendicular to the base-line, measured in the horizontal projection (positive, on the left-hand objective axis being turned to the left with respect to the perpendicular to the base-line).

$\beta_1$ : angle of inclination of the left-hand objective axis relatively to the horizontal plane (positive, when the left hand objective axis is inclined upwards).

$\beta_2$ : angle of inclination of the right-hand objective axis relatively to the horizontal plane (positive, when the right-hand objective axis is inclined upwards).

$\gamma$ : angle of inclination of the two objective axes relatively to one another, measured in the horizontal projection (positive, on the objective axes being convergent).

The angle $\delta$ is determined by the equation:

$$\tan \delta = \tan \beta_2 \cdot \cos \gamma.$$

When, furthermore, the small slides $d_6$, $e_9$ and $h_6$, the slides $n_1$ and $o_1$ and the slides of the stereo-comparator are so adjusted that the images of the object-point, indicated by the drawing pencil $z_1$ on the drawing board $z_2$, are seen to coincide with the marks of the microscope $m$, the device is ready for tracing ground plan projections of optional parts of the surface of the spatial image determined by the two photograms. The tracing is effected by actuating the hand-wheels $b_6$, $c_3$ and $q_{15}$ and the foot-disc $a_7$. An actuation of the foot-disc $a_7$ is only required when tracing a line, the points of which correspond to object-points lying at different heights. The actuation of the hand-wheel $q_{15}$ only takes place from time to time in order to maintain the stereoscopic effect.

The required coupling of the studs $O_1$ and $P_1$ with the slide $A_1$ may also be realized by a number of other constructions. In the first place a connection of the slide $A_1$ with the studs $O_1$ and $P_1$ by means of double levers in connection with angle levers is thought of. Furthermore, the slide $A_1'$ might be so disposed as to be displaceable in the depth-direction, which would entail a simplification of the lever connection. It would also be expedient to dispense with the lateral slide $A_1$ altogether, and to actuate the double lever $e_1$, $e_2$ directly by means of the intermediate slide $A_1'$.

Moreover, the invention includes types of construction of the stereo-autograph, which correspond to the first paragraph of the description (compare the patent specification 1151996), and in which, besides, each of the two points of application, on the slide B of the lever system connecting the slides B and $B_1$, and on the slide C of the lever system connecting the slides C and $B_1$, is so disposed as to be adjustable relatively to the respective slide. According to the invention the first of these two points of application is coupled with the slide A, and the second one with the slide D, in such a manner that a displacement of either of the two slides in the height-direction of the photograms causes a setting of the point of application coupled with it relatively to the respective slide in the same direction. When the slide A carries the microscope, or both photograms, the point of application coupled with the slide D must, in addition, be coupled with the slide A in such a manner that, when the latter slide is displaced in the height-direction of the photograms, the said point is also set in this direction. Said arrangements also represent types of construction of the stereo-autograph, which are suitable for conveniently utilizing photograms, at the taking of which the objective axes were directed into space at will. In the following two such types of construction may be elucidated.

Figs $2^a$ and $2^b$ of the drawing represent the first of these two types of construction. The lettering is, as far as is admissible, taken over from Figs. $1^a$ and $1^b$. For the stereo-comparator the special case exists that the slide A regulates the shifting of the two photograms, that the microscope is rigidly fixed, that the slide B is disposed on the slide A and carries the left-hand photogram, and that the slides C and D form a cross-slide system disposed on the slide A, D being the top slide and carrying the right-hand photogram. The slide D is again to be actuated by hand, by means of the hand-wheel $q_{15}$. In consideration of the deviations in construction of the stereo-comparator as compared with Figs. $1^a$ and $1^b$, the following alterations as regards Figs. $1^a$ and $1^b$ are necessary. Since the slides B and C take part in the movement of the slide A, they are connected with the short arms $d_2$ and $h_2$ of the double levers $d_1$, $d_2$, and $h_1$, $h_2$ respectively, in the following manner. The slide $d_5$ is displaceably disposed on the bed-plate G, and the scale $d_9$ appertaining to its index $d_8$ is marked on the bed-plate. The clamping-screw $d_{10}$ serves for clamping the slide $d_5$ on the bed-plate. The stud O is fitted on a slide $d_{11}$, which is disposed on the slide $d_5$ so as to be displaceable in the breadth-direction, and which carries a transverse slideway $d_{12}$, in which the small slide $d_6$ of the slide B engages by means of a pin $d_{13}$. In corresponding manner the slide $h_5$ is also displaceably disposed on the bed-plate G, and the scale $h_9$ marked on the bed-plate. The clamping screw $h_{10}$ serves for clamping the slide $h_5$ on the bed-plate. The stud P is fitted on a slide $h_{11}$, which is disposed on the slide $h_5$ so as to be displaceable in the breadth-direction, and which carries a transverse slide-way $h_{12}$, in which a pin $h_{13}$ of the small slide $h_6$ engages.

Besides, Figs. $2^a$ and $2^b$ show the following alterations as compared with Figs. $1^a$ and $1^b$. The members, necessary for coupling the studs $O_1$ and $P_1$ with the slide $A_1$, are dispensed with. The stud $O_1$ is rigidly mounted on the slide $B_1$, and the stud $P_1$ to the slide $i_5$, so that the slides $m_1$, $i_9$ and $i_{11}$, being superfluous, are discarded. The slide $d_5$ must during copying not be fixed any more by means of the clamping-screw $d_{10}$ to the bed-plate G, but must be so coupled with the slide A that it receives, on the latter slide being displaced, a displacement in the depth-direction which depends on the displacement of the slide A. For this purpose in a guiding slot $p_1$ of the bed-plate G, which slot is parallel to the breadth-direction, a slide $p_2$ is adjustably disposed, and may be clamped on the bed-plate G by means of a clamping-screw $p_3$. The slide $p_2$ carries a turning-bolt $p_4$, which passes through a slot $p_5$ of the bottom flange of a lever $p_6$ containing two superposed flanges, whereby on this bottom flange a slide is to be supposed fitted so as to be adjustable in the slot direction, which slide is provided with a bore, through which the turning-bolt $p_4$ also passes, so as to fit tightly, and which slide may be fixed to the bottom flange. The top flange of the lever $p_6$ is provided with two slots. In the one slot $p_7$ there engages a stud $p_8$ of a small slide $p_9$, which latter forms part of the slide $d_5$. This small slide is for adjusting purposes so disposed that it may be set relatively to the slide $d_5$ in the depth-direction, and it may be clamped on the slide $d_5$ by means of a clamping-screw $p_{10}$. In the other slot $p_{11}$ there engages a stud $p_{12}$ of the slide A. An index $p_{13}$ of the slide $p_2$ indicates on a scale $p_{14}$ of the bed-plate G the component, falling into the breadth-direction, of the distance of the turning-bolt $p_4$ from the stud $p_8$. The scale $p_{14}$ is lettered in angles. The division of the scale is calculated in such a manner that the distance of a division corresponding to an angle $\phi$ from the division corresponding to the angle zero is equal to a quotient, the numerator of which contains the product of the sine of the angle $\phi$ and of the component, falling into the breadth-direction, of the distance apart of the studs $p_8$ and $p_{12}$ and the denominator of which contains the sum $1+\sin \phi$. When the turning-bolt $p_4$ is situated vertically beneath the stud $p_8$, the slide $p_2$ occupies its zero-position, in which its index $p_{13}$ indicates on the scale $p_{14}$ the angle zero. When the turning-bolt occupies a position between the two studs $p_8$ and $p_{12}$, a positive angle is indicated.

Since the displacement of the slide A, owing to deviating arrangement of the stereo-comparator, has changed its sign, the scale $g_2$ of the slide $C_1$ must be oppositely directed as compared with Figs. 1ª and 1ᵇ. The graduation $e_{15}$ of the arm $e_1$ advances in counter-clockwise direction. The slide $h_5$ must during copying not be clamped any more on the bed-plate G by means of the clamping-screw $h_{10}$, but must be so coupled with the slides A and D that it receives, on these slides being displaced, a displacement in the depth-direction which depends on the displacement of the slides A and D. For this purpose the coupling of the stud P with the slides A and D respectively is assumed to be effected in a similar manner as stated, for the left-hand photogram. In a guiding-slot $q_1$ of the bed-plate G, which slot is parallel to the breath-direction, a slide $q_2$ is adjustably disposed, and may be clamped on the bed-plate G by means of a clamping-screw $q_3$. The slide $q_2$ carries a turning-bolt $q_4$, which passes through a slot $q_5$ of the bottom flange of a lever $q_6$, containing two superposed flanges, whereby on this bottom flange there is a slide to be supposed fitted so as to be adjustable in the slot direction, which slide is provided with a bore, through which the turning-bolt $q_4$ also passes, so as to fit tightly, and which may be fixed to the bottom flange. The top flange of the lever $q_6$ is provided with two slots. In the one slot $q_7$ there engages a stud $q_8$ of a small slide $q_9$, the latter forming part of the slide $h_5$. This small slide is for adjusting purposes so disposed that it may be set relatively to the slide $h_5$ in the depth-direction, and it may be clamped on the slide $h_5$ by means of a clamping-screw $q_{10}$. In the other slot $q_{11}$ there engages a stud $q_{12}$ of a slide $q_{13}$, which is disposed on the slide A so as to be adjustable in the direction of displacement of the latter slide, and which may be actuated from the hand-wheel $q_{15}$ by means of a screw-spindle $q_{14}$. The slide $q_{13}$ is coupled with the slide D in such a manner that it only takes part in the displacements of this slide in the depth-direction (hence retains its position with respect to the slide A, when the slide C is displaced). For this purpose the stud $q_{12}$ additionally engages in a slide-way $q_{16}$, lying in the breadth-direction, of the slide D. An index $q_{17}$ of the slide $q_2$ indicates on a scale $q_{18}$ of the bed-plate G the component, falling into the breadth-direction, of the distance of the turning-bolt $q_4$ from the stud $q_8$. The division of the scale is calculated in such a manner that the distance of a division corresponding to an angle $\varphi$ from the division corresponding to the angle zero is equal to a quotient, the numerator of which contains the product of the sine of the angle $\varphi$ and of the component, falling into the breadth-direction, of the distance apart of the studs $q_8$ and $q_{12}$ and the denominator of which contains the sum $1+\sin \varphi$. When the turning-bolt $q_4$ is situated vertically beneath the stud $q_8$, the slide $q_2$ occupies its zero-position, in which its index $q_{17}$ indicates on the scale $q_{18}$ the angle zero. When the turning-bolt occupies a position between the two studs $q_8$ and $q_{12}$, a positive angle must be indicated.

In order to get the device ready for use, the following settings are necessary. The index $d_8$ indicates on the scale $d_9$, on the lever $p_6$ being set into the breadth-direction, the value $f \cos \beta_1$. The index $e_{10}$ indicates on the scale $e_{11}$ the value $f$. The index $h_8$ indicates on the scale $h_9$, on the lever $q_6$ being set into the breadth-direction, the value $f \cos \beta_2$. The index $e_{14}$ indicates on the graduation $e_{15}$ the angle $\beta_1$. The index $h_{14}$ indicates on the graduation $h_{15}$ the angle $\gamma$. The index $p_{13}$ indicates on the scale $p_{14}$ the angle $\beta_1$ and the index $q_{17}$ on the graduation $q_{18}$ the angle $\beta_2$. On the scale $i_4$ there is indicated by the index $i_3$ the value $b \cos \alpha \epsilon$, measured in the scale of the copy, whilst the index $i_7$ indicates on the scale $i^8$ the value $b \sin \alpha \cos \epsilon$, measured in the scale of the copy.

When, furthermore, the small slides $d_6$, $e_9$ and $h_6$ and the slides of the stereo-comparator are so adjusted that the images of the object-point, indicated by the drawing pencil $z_1$ on the drawing board $z_2$, are seen to coincide with the marks of the microscope M, and when besides the set-screws $d_{10}$ and $h_{10}$ all set-screws are tightened, the device is ready for tracing ground plan projections of optional parts of the surface of the spatial image determined by the two photograms. The tracing is effected by actuating the hand-wheels $b_6$, $c_3$ and $q_{15}$ and the foot-disc $a_7$. An actuation of the foot-disc $a_7$ is only required when tracing a line, the points of which correspond to object-points lying at different heights. The actuation of the hand-wheel $q_{15}$ only takes place from time to time in order to maintain the stereoscopic effect.

Figure 3:
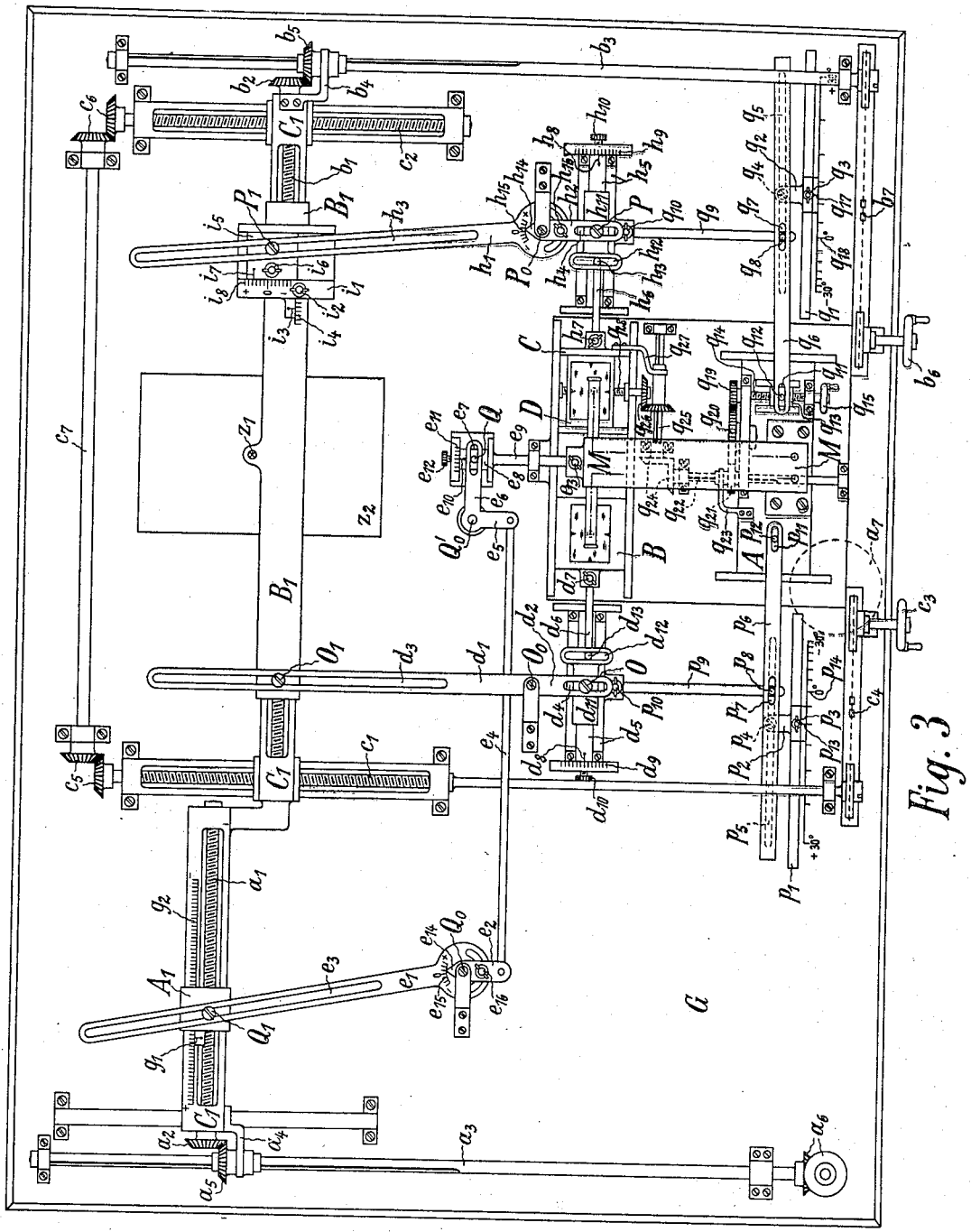

In Figs. 3ª and 3ᵇ the second of the aforesaid two types of construction is represented. It shows as compared with that of Figs. 2ª and 2ᵇ merely alterations, necessitated by the slide A of the stereo-comparator carrying the microscope M instead of the two photograms, by the setting of an image-point therefore requiring the opposite displacement of the slide A, as compared with the setting of the same image-point in the case of Figs. 2a and 2b.

The division of the scale $p_{14}$ is calculated in such a manner that the distance of a division corresponding to an angle φ from the division corresponding to the angle zero is equal to a quotient, the numerator of which contains the product of the sine of the angle φ and of the component, falling into the breadth-direction, of the distance apart of the studs $p_8$ and $p_{12}$ and the denominator of which contains the difference 1-sin φ. When the turning-bolt $p_4$ is situated vertically beneath the stud $p_8$, the slide $p_2$ occupies its zero-position, in which its index $p_{13}$ must indicate on the scale $p_{14}$ the angle zero. When the turning-bolt is so positioned that its distance from the stud $p_{12}$ is greater than the relative distance of the two studs, a positive angle must be indicated.

The arrangement of the stereo-comparator having been chosen according to the first example (vide Figs. 1a and 1b) the coupling between the slides A and $A_1$ must also be chosen according to the first example. As compared with the second example (vide Figs. 2a and 2b) the sense of direction of the scale $g_2$ and the sense of direction of the division $b_{15}$ is therefore altered.

The division of the scale $q_{18}$ is calculated in such a manner that the distance of a division corresponding to an angle φ from the division corresponding to the angle zero is equal to a quotient, the numerator of which contains the product of the sine of the angle φ and of the component, falling into the breadth-direction, of the distance apart of the studs $q_8$ and $q_{12}$ and the denominator of which contains the difference 1-sin φ. When the turning-bolt $q_4$ is situated vertically beneath the stud $q_8$, the slide $q_2$ occupies its zero-position, in which its index $q_{17}$ must indicate on the scale $q_{18}$ the angle zero. When the turning-bolt is so positioned that its distance from the stud $q_{12}$ is greater than the relative distance of the two studs, a positive angle must be indicated.

In order that the slide $q_{13}$, which carries the stud $q_{12}$ engaging in the slot $q_{11}$ of the lever $q_6$, receives, on the slide D being displaced in the depth-direction, a displacement relatively to the slide A which is equal to the displacement of the slide D but oppositely directed to the same (without displacements of the slide D in the breadth-direction, caused by displacements of the slide C, affecting the setting of the slide $q_{13}$), the screw-spindle $q_{14}$, which is mounted on the slide A, is provided with left-handed thread and carries at one extremity a toothed wheel $q_{19}$. The latter engages with a toothed wheel $q_{20}$, which is mounted on the slide A and in its turn engages in a third toothed wheel $q_{21}$ having the same division and number of teeth as the wheel $q_{19}$. This third toothed wheel is so disposed that it may be displaced longitudinally on a grooved shaft $q_{22}$, which is rotatably mounted on the bed-plate G, and is parallel to the direction of displacement of the slide A, the said wheel being taken along with the slide A by means of a stud $q_{23}$ of this slide. By means of a pair of bevel wheels $q_{24}$ is caused the rotation of the grooved shaft $q_{25}$, which is mounted on the bed-plate G so as to be parallel to the breadth-direction. A second pair of bevel-wheels $q_{26}$, one wheel of which is so disposed as to be displaceable longitudinally on the said grooved shaft $q_{25}$, and is taken along with the slide C by means of a stud $q_{27}$ of this slide, transmits the rotation of the said grooved shaft $q_{25}$ to a right-handed screw-spindle $q_{28}$, which actuates the slide D, and is mounted on the slide C so as to be parallel to the depth direction, in such a manner that the said spindle always receives the same rotation, agreeing as regards amount and sense of direction, as the grooved shaft $q_{22}$.

In order to get the device ready for use, the same adjustments are necessary as in the device shown in the second example. The operation remains the same.

If the stereo-autograph has to serve for utilizing photograms, at the taking of which the angles of inclination of the objective axes with respect to the horizontal plane were considerably different from one another, the setting of the slide D has to be effected not only occasionally but more or less continually. In this case it will be recommended to provide for the slide D an automatic setting instead of the setting by hand, which means that then all relations existing between the plate co-ordinates and the spatial co-ordinates are automatically maintained, in which manner the manipulation of the stereo-autograph becomes substantially simplified. According to the invention the said automatic setting of the slide D may be realized by a further slide $A_1'$ being provided on the slide $C_1$ of the cross-slide system $A_1$, $B_1$, $C_1$, which slide is so coupled with the slide $A_1$ that it receives, on the latter slide being displaced relatively to the slide $C_1$, likewise a displacement relatively to this slide, whereby the slides D and $A_1'$ are positively connected together by means of a lever system, of which the point of application on the slide $A_1'$ is so disposed as to be adjustable relatively to this slide, and is so coupled with the slide $B_1$ that it receives, on the latter slide being displaced relatively to the slide $C_1$, a setting relatively to the slide $A_1'$.

According to the invention a second realization of the automatic setting of the slide D is attained by providing on the slide $C_1$ of the cross-slide system $A_1$, $B_1$, $C_1$, a further slide $A_1'$, which is so coupled with the slide $A_1$ that it receives, on the latter being displaced relatively to the slide $C_1$, likewise a displacement relatively to this slide, whereby the slides D and $A_1'$ are positively connected together by means of a lever system, of which the point of application on the slide $A_1'$ is so disposed as to be adjustable relatively to this slide, and of which the point of application on the slide D is so coupled with the slide C that it receives, on the latter slide being displaced in the breadth-direction of the photogram, a setting relatively to the slide D.

Each of these two solutions becomes simplest as regards construction, if for the stereo-comparator the special case exists that the microscope M is rigidly fixed, and that the slides A and B are intended only for the setting of the left-hand photogram, and the slides C and D for the setting of the right-hand photogram. The first solution is represented in Figs. 4$^a$ and 4$^b$, the second solution in Figs. 5$^a$ and 5$^b$ of the drawing.

Figure 4:
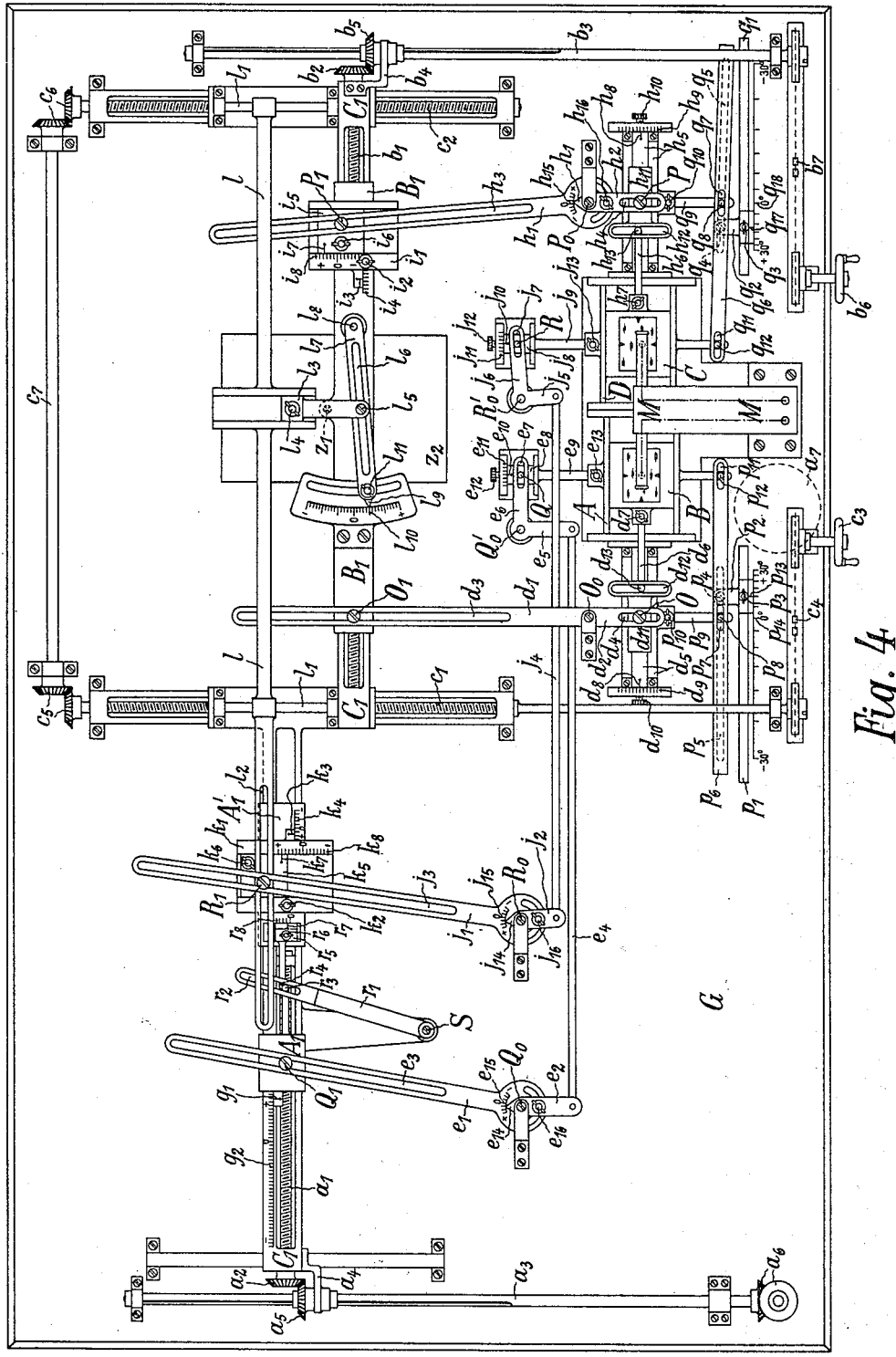

Figs. 4$^a$ and 4$^b$ chiefly differ from Figs. 2$^a$ and 2$^b$ by the slide D being automatically set. Further deviating is the slide A only regulating the setting of the left-hand photogram, and the slide D forming the bottom slide of the cross-slide system C, D. This altered arrangement of the stereo-comparator only involves the necessity of an alteration of the connection of the lever $q_6$ with the slide D in such a manner that the stud $q_{12}$ engages in the slot $q_{11}$ of the lever, $q_6$ is fixed directly to the slide D.

In order to dispense with the manual adjustment of the slide D, the following coupling of the slide $A_1$ with the slide D is provided. A slide $A_1'$ is disposed on the slide $C_1$, and coupled with the slide $A_1$ in such a manner that it receives, on the latter slide being displaced, a displacement in the same direction which is dependent on the displacement of the slide $A_1$. For this purpose a forked lever $r_1$ is so fitted to a stand of the slide $C_1$ as to be rotatable about an axis S, the two superposed fork-ends of which lever each being provided with a slot $r_2$. In the slot of the top fork-end there engages a stud $r_3$ of the slide $A_1$, in that of the bottom fork-end a stud $r_4$ of a slide $r_5$, which is disposed on the slide $A_1'$ so as to be adjustable in the depth-direction, and which may be clamped on the latter slide by means of a clamping screw $r_6$. The axis of rotation S of the lever $r_1$ is so positioned with respect to the slide $C_1$ that the lever is parallel to the depth-direction, in the case of the slide $A_1$ occupying its zero-position, thus in the case of the index $g_1$ indicating on the scale $g_2$ the value zero. That component set in each case, which falls into the depth-direction, of the relative distance of the two studs $r_3$ and $r_4$ is indicated by means of an index $r_7$ of the slide $r_5$ on a scale $r_8$ of the slide $A_1'$. The scale $r_8$ is lettered in angles. The division of the scale is calculated in such a manner that the distance of a division corresponding to an angle $\varphi$ from the division corresponding to the angle zero is equal to a quotient, the numerator of which contains the product of the component, falling into the depth-direction, of the distance of the stud $r_3$ from the axis of rotation S and of the difference $1-\cos\varphi$, and the denominator of which contains the value $\cos\varphi$. When the studs $r_3$ and $r_4$ are situated vertically one above the other, the slide $r_5$ occupies its zero-position, in which its index $r_7$ must indicate on the scale $r_8$ the angle zero. Any displacements of the slide $r_5$ out of its zero-position must always be so directed as to tend towards the enlargement of the distance of the stud $r_4$ from the axis of rotation S.

The slide $A_1'$ is connected with the slide D by means of a double lever $j_1$, $j_2$, which is mounted on the bed-plate G so as to be rotatable about an axis $R_0$, which, along with the axis of rotation $Q_0$ of the double lever $e_1$, $e_2$, lies in a plane containing the breadth-direction. The two arms $j_1$ and $j_2$ of the double lever are of different length, and their relative inclination is adjustable. In a slot $j_3$ of the long arm $j_1$ there engages a stud $R_1$, which is disposed on the upper slide of a cross-slide system arranged on the slide $A_1'$, the bottom slide $k_1$ of which system being so disposed on the slide $A_1'$ that it may be set in the breadth-direction, and it may be fixed relatively to the latter slide by means of a clamping-screw $k_2$. An index $k_3$ of the slide $k_1$ indicates on a scale $k_4$ of the slide $A_1'$ that value, by which the slide $k_1$ is displaced out of its zero-position. This zero-position is determined by the stud $R_1$ along with the axis of rotation $R_0$ having to lie in a vertical plane containing the depth-direction, when the slide $A_1$ occupies its zero-position, and when the value zero is indicated on the scale $k_4$. When positive values are indicated on the scale $k_4$, the distance of the stud $R_1$ from the stud $Q_1$ is smaller than in the case of the value zero being indicated. The upper slide $k_5$ of the cross-slide system $k_1$, $k_5$ is disposed on the lower slide $k_1$, so as to be adjustable in the depth-direction, and it may be clamped on the slide $k_1$ by means of a clamping-screw $k_6$. An index $k_7$ of the slide $k_5$ indicates on a scale $k_8$ of the slide $k_1$ that value by which the slide $k_5$ is displaced out if its zero-position. This zero-position is determined by the stud $R_1$ along with the stud $Q_1$ having to lie in a vertical plane containing the breadth-direction, when the slides $A_1$ and $B_1$ occupy their respective zero-position, and when the value zero is indicated on the scale $k_8$. When positive values are indicated on the scale $k_8$, the distance of the stud $R_1$ from the axis of rotation $R_0$ is greater than in the case of the value zero being indicated. In order that during copying the stud $R_1$ automatically receives, on the slide $B_1$ being displaced in the breadth-direction, a displacement in the depth-direction, which depends on the displacement of the slide $B_1$, the following coupling of the stud $R_1$ with the slide $B_1$ is provided. On the slide $C_1$ there is a slide $l$ so disposed as to be displaceable along two guides $l_1$ in the depth-direction, which slide, on the one hand, is provided with a slot $l_2$ being parallel to the breadth-direction, in which slot the stud $R_1$ engages, and on which slide, on the other hand, there is disposed a slide $l_3$, which may be set in the depth-direction and may be rigidly connected with the slide $l$ by means of a clamping-screw $l_4$. The said slide $l_3$ engages by means of a pin $l_5$ in a slot $l_6$ of a lever $l_7$, which is so disposed that it may be rotated about a pin $l_8$ of the slide $B_1$, and that the inclination of its slot $l_6$ with respect to the breadth-direction may be varied. The inclination set in each case is indicated by means of an index $l_9$ of the lever $l_7$ on a graduation $l_{10}$ of the slide $B_1$, which graduation advances in counter-clockwise direction. By means of a clamping-screw $l_{11}$ the lever $l_7$ may be clamped on the slide $B_1$. The short arm $j_2$ of the double lever $j_1$, $j_2$ engages by means of a rod $j_4$ with one arm $j_5$ of an angle-lever, which is disposed on the bed-plate G so as to be rotatable about an axis $R_0'$, which, along with the axis of rotation $R_0$, lies in a plane containing the breadth-direction. The arm $j_5$ of the angle-lever is of the same length as the arm $j_2$ of the double lever, and is parallel to this arm. It embraces with the other arm $j_6$ of the angle lever an angle of 90°. The arm $j_6$ engages by means of a slot $j_7$ with a stud R of a slide $j_8$, which is disposed on a small slide $j_9$ so as to be adjustable in the breadth-direction. The said small slide $j_9$ forms part of the slide D, and is for adjusting purposes so disposed that it may be set relatively to the slide D in the direction of displacement of the same. An index $j_{10}$ of the slide $j_8$ indicates on a scale $j_{11}$ of the small slide $j_9$ the component falling into the breadth-direction, which is set in each case of the distance of the stud R from the axis of rotation $R_0'$. A clamping-screw $j_{12}$ serves for clamping the slide $j_8$ on the small slide $j_9$, and a second clamping-screw $j_{13}$ for clamping the small slide $j_9$ on the slide D. The part below 180° of the angle, embraced by the arms $j_1$ and $j_2$ of the double lever $j_1$, $j_2$ and measured from the arm $j_1$ in clockwise direction, is indicated by means of an index $j_{14}$ of the arm $j_2$ on a graduation $j_{15}$ of the arm $j_1$, which graduation advances in counter-clockwise direction. A clamping-screw $j_{16}$ serves for fixing the two arms relatively to each other.

In order to get the device ready for use, it is necessary to set the indices $d_8$, $e_{10}$, $e_{14}$, $h_8$, $h_{14}$, $i_3$, $i_7$, $p_{13}$ and $q_{17}$ each to the appertaining scale as in the second and third example. In addition, it is requisite to make the following settings. The index $j_{10}$ indicates on the scale $j_{11}$ the value $f$. The index $j_{14}$ indicates on the graduation $j_{15}$ the angle $\epsilon_2$. The index $k_3$ indicates on the scale $k_4$ the value $$\frac{b \sin \epsilon}{\cos \gamma},$$

measured in the scale of the copy. The index $k_7$ indicates on the scale $k_8$, on the double lever $d_1$, $d_2$ being parallel to the depth-direction, the value $$\frac{b \cos \epsilon \sin (a+\gamma)}{\cos \gamma},$$

measured in the scale of the copy. On the graduations $l_{10}$ and $r_8$ the angle $\gamma$ is indicated by the indices $l_9$ and $r_7$ respectively.

When, in addition, such an arrangement has been made that the images of the object-point, indicated by the drawing pencil $z_1$ on the drawing board $z_2$, are seen to coincide with the marks of the microscope M, and when besides the set screws $d_{10}$, $h_{10}$ and $k_6$ all set-screws are tightened, the device is ready for tracing ground plan projections of optional parts of the surface of the spatial image determined by the two photograms. The tracing is effected by actuating the hand-wheels $b_6$ and $c_3$ and the foot-disc $a_7$. An actuation of the foot-disc is only necessary when tracing a line, the points of which correspond to object-points lying at different heights.

Figure 5:
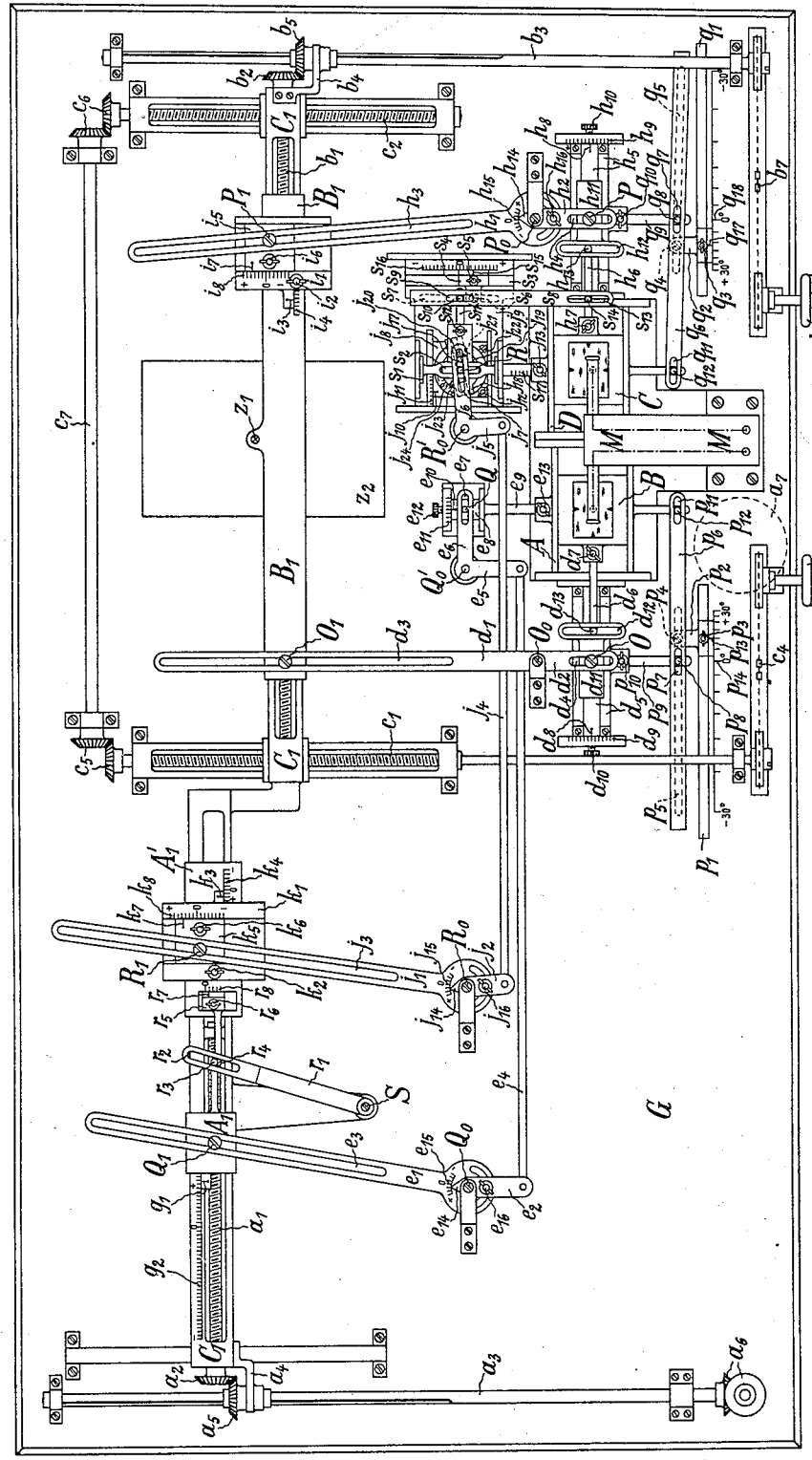

Figs. 5ª and 5ᵇ differ from Figs. 4ª and 4ᵇ only with regard to the coupling of the slide $A_1$ with the slide D, which shows the following alterations.

The scale $r_8$ lettered in angles is so computed that the distance of a division corresponding to an angle φ from the division corresponding to the angle zero is equal to the product of the component, falling into the depth-direction, of the distance of the stud $r_3$ from the axis of rotation S and of the difference 1-cos φ. When the studs $r_3$ and $r_4$ lie vertically one above the other, the slide $r_5$ occupies its zero-position, in which its index $r_7$ must indicate on the scale $r_8$ the angle zero. Any displacements of the slide $r_5$ out of its zero-position must always be so directed as to tend towards the lessening of the distance of the stud $r_4$ from the axis of rotation S.

The coupling of the stud $R_1$ with the slide $B_1$ becomes void, but a coupling of the stud R with the slide C must be provided. This coupling must be arranged in such a manner that, on the setting of the slide C in the breadth-direction, the stud R receives a setting, dependent on that setting of the slide C, in a direction inclined with respect to the breadth-direction by an adjustable angle. For this purpose the said stud is not disposed any more directly on the slide $j_8$ but on a slide $j_{17}$, which is disposed displaceably along a straight-guide $j_{18}$ of a revolving slide $j_{19}$. When the slide $j_{17}$ occupies its zero-position, the stud R lies in the axis of the said revolving slide. When the slide $j_{17}$ is so positioned, its index $j_{20}$ points at a contra-index $j_{21}$ of the straight-guide $j_{18}$. The revolving slide $j_{19}$ is mounted on the slide $j_8$, and may be clamped on this slide by means of a clamping screw $j_{22}$, an index $j_{23}$ of the revolving slide $j_{19}$ indicating on a graduation $j_{24}$ of the slide $j_8$, which graduation advances in counter clockwise direction, that angle by which the revolving slide is turned out of its zero-position. The zero-position is determined by the straight-guide $j_{18}$ having to be parallel to the breadth-direction. On the small slide $j_9$ there is a slide $s_1$ disposed so as to be displaceable in the breadth-direction, which slide is provided with a slot $s_2$ parallel to the depth-direction, in which slot the stud R engages. The said slide $s_1$ is coupled with the slide C in the following manner. In a guiding-groove $s_3$ of the small slide $j_9$, which groove is parallel to the depth-direction, there is a slide $s_4$ adjustably disposed, which may be clamped on the small slide $j_9$ by means of a clamping-screw $s_5$. The slide $s_4$ carries a turning-bolt $s_6$, which passes through a slot $s_7$ of the bottom flange of a lever $s_8$ containing two superposed flanges, whereby on the bottom flange a slide is to be supposed fitted so as to be adjustable in the slot-direction, which slide is provided with a bore, through which the turning-bolt $s_6$ also passes, so as to fit tightly, and which slide may be fixed to the bottom flange. The top-flange is provided with two slots. In the one slot $s_9$ there engages a stud $s_{10}$ of a small slide $s_{11}$, which forms part of the slide $s_1$. This small slide is for adjusting purposes so disposed that it may be set relatively to the slide $s_1$ in the breadth-direction, and it may be clamped on the slide $s_1$ by means of a clamping-screw $s_{12}$. In the other slot $s_{13}$ here engages a stud $s_{14}$ of the small slide $h_6$, which appertains to the slide C. By means of an index $s_{15}$ of the slide $s_1$ there is indicated on a scale $s_{16}$ of the small slide $j_9$ the component set in each case, falling into the depth-direction, of the distance from the turning-bolt $s_6$ to the stud $s_{10}$, and the edge of the slide D indicates on a scale $s_{17}$ of the small slide $j_9$ the component set in each case, falling into the depth-direction, of the relative distance of the two studs $s_{10}$ and $s_{14}$. When the turning-bolt $s_6$ is situated vertically beneath the stud $s_{10}$, the slide $s_4$ occupies its zero-position, in which its index $s_{15}$ must indicate on the scale $s_{16}$ the value zero. When the turning-bolt $s_6$ is situated between the two studs $s_{10}$ and $s_{14}$, a positive value is indicated on the scale $s_{16}$.

In order to get the device ready, for use it is necessary to set the indices $d_8$, $e_{10}$, $e_{14}$, $h_8$, $h_{14}$, $i_3$, $i_7$, $j_{10}$, $j_{14}$, $p_{13}$, $q_{17}$ and $r_7$ each to the appertaining scale as in the fourth example. In addition, it is requisite to make the following settings. The index $k_3$ indicates on the scale $k_4$ the value $b \cos \gamma \sin \varepsilon$, measured in the scale of the copy. The index $k_7$ indicates on the scale $k_8$ the value $b \sin \alpha \cos \varepsilon$, measured in the scale of the copy. The index $j_{23}$ indicates on the graduation $j_{24}$ the angle $\beta_2$. By the index $s_{15}$ there is indicated on the scale $s_{16}$ a value J which results from the equation $$J = K \frac{\cos \beta_2 \tan \gamma}{1 + \cos \beta_2 \tan \gamma}.$$

In this equation K means the relative distance of the studs $s_{10}$ and $s_{14}$ indicated on the scale $s_{17}$ by the edge of the slide D.

When, in addition, such an arrangement has been made that the images of the object-point, indicated by the drawing pencil $z_1$ on the drawing board $z_2$, are seen to coincide with the marks of the microscope M, and when besides the set screws $d_{10}$ and $h_{10}$ all set screws are tightened, the device is ready for tracing ground plan projections of optional parts of the surface of the spatial image determined by the two photograms. The operation of the device is the same as that mentioned in the fourth example.

I claim:

1. In a device for tracing on a plane surface linear elements of the surface, to be obtained from a photo-stereogram, of a spatial form, a bed-plate, a stereo-comparator comprising a binocular double microscope and four slides A, B, C, and D, a drawing device comprising three slides $A_1$, $B_1$, and $C_1$, of which $C_1$ is the bottom member and carries $A_1$ and $B_1$, which are disposed next to each other, and furthermore a drawing pencil disposed on the slide $B_1$, and a drawing board fixed to the said bed-plate, means comprising three lever systems for positively coupling the slides A and $A_1$, B and $B_1$, and C and $B_1$ respectively, means for setting the point of application of the lever system connecting the slides C and $B_1$ on the slide $B_1$ relatively to the latter slide, and means for coupling with the slide $A_1$ the said point of application, so that it receives a setting relatively to the slide $B^1$, on the slide $A_1$ being displaced relatively to the slide $C_1$.

2. In a device for tracing on a plane surface linear elements of the surface, to be obtained from a photo-stereogram, of a spatial form, a bed-plate, a stereo-comparator comprising a binocular double microscope and four slides A, B, C, and D, a drawing device comprising three slides $A_1$, $B_1$, and $C_1$, of which $C_1$ is the bottom member and carries $A_1$ and $B_1$, which are disposed next to each other, and furthermore a drawing pencil disposed on the slide $B_1$, and a drawing board fixed to the said bed-plate, means comprising three lever systems for positively coupling the slides A and $A_1$, B and $B_1$, and C and $B_1$ respectively, means for setting the point of application of the lever system connecting the slides C and $B_1$ on the slide $B_1$ relatively to the latter slide, and means for coupling with the slide $A_1$ the said point of application as well as the point of application of the lever system connecting the slides B and $B_1$ on the slide $B_1$, so that both points of application receive a setting relatively to the slide $B_1$, on the slide $A_1$ being displaced relatively to the slide $C_1$.

3. In a device for tracing on a plane surface linear elements of the surface, to be obtained from a photo-stereogram, of a spatial form, a bed-plate, a stereo-comparator comprising a binocular double microscope and four slides A, B, C, and D, a drawing device comprising three slides $A_1$, $B_1$, and $C_1$, of which $C_1$ is the bottom member and carries $A_1$ and $B_1$, which are disposed next to each other, and furthermore a drawing pencil disposed on the slide $B_1$, and a drawing board fixed to the said bed-plate, means comprising three lever systems for positively coupling the slides A and $A_1$, B and $B_1$, and C and $B_1$ respectively, means for setting the point of application of the lever system connecting the slides B and $B_1$ on the slide B relatively to the latter slide, means for coupling the said point of application with the slide A, so that it receives a setting in the height-direction of the photo-stereogram, on the slide A being displaced in this direction, means for setting both points of application of the lever system connecting the slides C and $B_1$, each relatively to the appertaining slide, and means for coupling with the slide D the point of application of the lever system connecting the slides C and $B_1$ on the slide C, so that it receives a setting in the height-direction of the photo-stereogram, on the slide D and the microscope being displaced relatively to one another in this direction.

4. In a device for tracing on a plane surface linear elements of the surface, to be obtained from a photo-stereogram, of a spatial form, a bed-plate, a stereo-comparator comprising a binocular double microscope and four slides A, B, C, and D, a drawing device also comprising four slides $A_1$, $B_1$, $C_1$, and $A_1'$, of which $C_1$ is the bottom member and carries $A_1$ and $B_1$, disposed next to each other, and $A_1'$, and furthermore a drawing pencil disposed on the slide $B_1$, and a drawing board fixed to the said bed-plate, means comprising four lever systems for positively coupling the slides A and $A_1$, B and $B_1$, C and $B_1$, and D and $A_1'$, respectively, means for coupling the slide $A_1'$ with the slide $A_1$, so that it receives a displacement relatively to the slide $C_1$, on the slide $A_1$ being displaced relatively to $C_1$, means for setting the point of application of the lever system connecting the slides C and $B_1$ on the slide $B_1$ relatively to the latter slide, means for coupling with the slide $A_1$ the said point of application, so that it receives a setting relatively to the slide $B_1$, on the slide $A_1$ being displaced relatively to the slide $C_1$, means for setting the point of application of the lever system connecting the slides D and $A_1'$ on the slide $A_1'$ relatively to the latter slide, and means for coupling the said point of application with the slide $B_1$, so that it receives a setting relatively to the slide $A_1'$, on the slide $B_1$ being displaced relatively to the slide $C_1$.

5. In a device for tracing on a plane surface linear elements of the surface, to be obtained from a photo-stereogram, of a spatial form, a bed-plate, a stereo-comparator comprising a binocular double microscope and four slides A, B, C, and D, a drawing device also comprising four slides $A_1$, $B_1$, $C_1$, and $A_1'$, of which $C_1$ is the bottom member and carries $A_1$ and $B_1$, disposed next to each other, and $A_1'$, and furthermore a drawing pencil disposed on the slide $B_1$, and a drawing board fixed to the said bed-plate, means comprising four lever systems for positively coupling the slides A and $A_1$, B and $B_1$, C and $B_1$, and D and $A_1'$ respectively, means for coupling the slide $A_1'$ with the slide $A_1$, so that it receives a displacement relatively to the slide $C_1$, on the slide $A_1$ being displaced relatively to $C_1$, means for setting the point of application of the lever system connecting the slides B and $B_1$ on the slide B relatively to the latter slide, means for coupling the said point of application with the slide A, so that it receives a setting in the height-direction of the photo-stereogram, on the slide A being displaced in this direction, means for setting both points of application of the lever system connecting the slides C and $B_1$, each relatively to the appertaining slide, means for coupling with the slide D the point of application of the lever system connecting the slides C and $B_1$ on the slide C, so that it receives a setting in the height-direction of the photo-stereogram, on the slide D and the microscope being displaced relatively to one another in this direction, means for setting the point of application of the lever system connecting the slides D and $A_1'$ on the slide $A_1'$ relatively to the latter slide, and means for coupling the said point of application with the slide $B_1$, so that it receives a setting relatively to the slide $A_1'$, on the slide $B_1$ being displaced relatively to the slide $C_1$.

6. In a device for tracing on a plane surface linear elements of the surface, to be obtained from a photostereogram, of a spatial form, a bed-plate, a stereo-comparator comprising a binocular double microscope and four slides A, B, C, and D, a drawing device also comprising four slides $A_1$, $B_1$, $C_1$ and $A_1'$, of which $C_1$ is the bottom member and carries $A_1$ and $B_1$, disposed next to each other, and $A_1'$, and furthermore a drawing pencil disposed on the slide $B_1$, and a drawing board fixed to the said bed-plate, means comprising four lever systems for positively coupling the slides A and $A_1$, B and $B_1$, C and $B_1$, and D and $A_1'$ respectively, means for coupling the slide $A_1'$ with the slide $A_1$, so that it receives a displacement relatively to the slide $C_1$, on the slide $A_1$ being displaced relatively to $C_1$, means for setting the point of application of the lever system connecting the slides C and $B_1$ on the slide $B_1$ relatively to the latter slide, means for coupling with the slide $A_1$ the said point of application, so that it receives a setting relatively to the slide $B_1$, on the slide $A_1$ being displaced relatively to the slide $C_1$, means for setting the point of application of the lever system connecting the slides D and $A_1'$ on the slide $A_1'$ relatively to the latter slide, and means for coupling with the slide C the point of application of the said lever system on the slide D, so that it receives a setting relatively to the slide D, on the slide C being displaced in the breadth-direction of the photo-stereogram.

7. In a device for tracing on a plane surface linear elements of the surface, to be obtained from a photo-stereogram, of a spatial form, a bed-plate, a stereo-comparator comprising a binocular double microscope and four slides A, B, C, and D, a drawing device also comprising four slides $A_1$, $B_1$, $C_1$, and $A_1'$, of which $C_1$ is the bottom member and carries $A_1$ and $B_1$, disposed next to each other, and $A_1'$, and furthermore a drawing pencil disposed on the slide $B_1$, and a drawing board fixed to the said bed-plate, means comprising four lever systems for positively coupling the slides A and $A_1$, B and $B_1$, C and $B_1$, and D and $A_1'$ respectively, means for coupling the slide $A_1'$ with the slide $A_1$, so that it receives a displacement relatively to the slide $C_1$, on the slide $A_1$ being displaced relatively to $C_1$, means for setting the point of application of the lever system connecting the slides B and $B_1$ on the slide B relatively to the latter slide, means for coupling the said point of application with the slide A, so that it receives a setting in the height-direction of the photo-stereogram, on the slide A being displaced in this direction, means for setting both points of application of the lever system connecting the slides C and $B_1$, each relatively to the appertaining slide, means for coupling with the slide D the point of application of the lever system connecting the slides C and $B_1$ on the slide C, so that it receives a setting in the height-direction of the photo-stereogram, on the slide D and the microscope being displaced relatively to one another in this direction, means for setting the point of application of the lever system connecting the slides D and $A_1'$ on the slide $A_1'$ relatively to the latter slide, and means for coupling with the slide C the point of application of the said lever system on the slide D, so that it receives a setting relatively to the slide D, on the slide C being displaced in the breadth-direction of the photo-stereogram.

WILLY SANDER.

Witnesses:
PAUL KRUGER,
RICHARD HAHN.